US009692650B2

(12) United States Patent
Kusumoto

(10) Patent No.: US 9,692,650 B2
(45) Date of Patent: *Jun. 27, 2017

(54) CONTROL APPARATUS, COMMUNICATION SYSTEM, COMMUNICATION METHOD, AND PROGRAM

(71) Applicant: NEC Corporation, Tokyo (JP)

(72) Inventor: Nobuhiro Kusumoto, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/059,523

(22) Filed: Mar. 3, 2016

(65) Prior Publication Data

US 2016/0261464 A1    Sep. 8, 2016

Related U.S. Application Data

(63) Continuation of application No. 14/376,835, filed as application No. PCT/JP2013/053079 on Feb. 8, 2013, now Pat. No. 9,407,503.

(30) Foreign Application Priority Data

Feb. 10, 2012   (JP) .................................. 2012-026813

(51) Int. Cl.
*H04L 1/00* (2006.01)
*H04L 12/24* (2006.01)
(Continued)

(52) U.S. Cl.
CPC ........ *H04L 41/0826* (2013.01); *H04L 12/185* (2013.01); *H04L 41/12* (2013.01);
(Continued)

(58) Field of Classification Search
CPC ......... H04L 45/28; H04L 45/29; H04L 45/30; H04L 47/10; H04L 47/11; H04L 47/12; H04L 47/13
(Continued)

(56) References Cited

U.S. PATENT DOCUMENTS

2003/0097470 A1    5/2003   Lapuh et al.
2005/0027801 A1    2/2005   Kashyap et al.
(Continued)

FOREIGN PATENT DOCUMENTS

CN    101197692 A    6/2008
CN    101272322 A    9/2008
(Continued)

OTHER PUBLICATIONS

Chinese Office Action issued by the Chinese Patent Office in counterpart Chinese Patent Application No. 201380008990.7, dated Apr. 12, 2016.
(Continued)

*Primary Examiner* — Dady Chery
(74) *Attorney, Agent, or Firm* — Finnegan, Henderson, Farabow, Garrett & Dunner, L.L.P.

(57) ABSTRACT

A control apparatus includes: a topology management unit that manages a network topology formed by including a plurality of relay apparatuses; a link aggregation group management unit that groups ports of the plurality of relay apparatuses, having a physical link with an arbitrary node of the network topology and manages the grouped ports as a port of a virtual logical link between the plurality of relay apparatuses and the arbitrary node; and a relay apparatus control unit that controls the plurality of relay apparatuses, having the grouped ports, so that, when one of the plurality of relay apparatuses receives a broadcast packet or a multicast packet, a plurality of same packet are not forwarded to the physical links that form the virtual logical link.

15 Claims, 16 Drawing Sheets

(51) Int. Cl.
*H04L 12/761* (2013.01)
*H04L 12/18* (2006.01)
*H04L 29/06* (2006.01)
*H04L 12/931* (2013.01)
*H04L 12/709* (2013.01)
*H04L 12/721* (2013.01)

(52) U.S. Cl.
CPC ............ *H04L 45/16* (2013.01); *H04L 45/245* (2013.01); *H04L 45/72* (2013.01); *H04L 49/70* (2013.01); *H04L 69/14* (2013.01); *Y02B 60/33* (2013.01)

(58) Field of Classification Search
USPC ................ 370/228, 216, 229, 235, 254, 252
See application file for complete search history.

(56) References Cited

U.S. PATENT DOCUMENTS

| | | |
|---|---|---|
| 2005/0163115 A1 | 7/2005 | Dontu et al. |
| 2008/0151890 A1 | 6/2008 | Zelig et al. |
| 2008/0232368 A1 | 9/2008 | Ikegami et al. |
| 2009/0225660 A1 | 9/2009 | Sakurai |
| 2010/0067374 A1 | 3/2010 | Elangovan et al. |
| 2010/0290464 A1 | 11/2010 | Assarpour |
| 2011/0188373 A1 | 8/2011 | Saito |
| 2011/0268115 A1 | 11/2011 | Attarwala et al. |
| 2012/0155254 A1 | 6/2012 | Hinosugi |

FOREIGN PATENT DOCUMENTS

| | | |
|---|---|---|
| CN | 101572656 A | 11/2009 |
| CN | 102137335 A | 7/2011 |
| EP | 2 252 012 A1 | 11/2010 |
| JP | 2010-514324 A | 4/2010 |
| JP | 2011-160171 | 8/2011 |
| JP | 2011-160171 A | 8/2011 |
| WO | WO 2010/030877 A1 | 3/2010 |

OTHER PUBLICATIONS

European Search Report dated Aug. 11, 2015.
"OpenFlow Switch Specification" XP055177510, https://www.opennetworking.org/images/stories/downloads/sdn-resources/onf-specifications/openflow/openflow-spec-v1.2.pdf., Dec. 5, 2011, pp. 1-85, v.1.2.
International Search Report dated Mar. 19, 2013 in International Patent Application Publication No. PCT/JP2013/053079.
Nick McKeown and seven other authors, "OpenFlow: Enabling Innovation in Campus Networks," [online], [Searched on Jan. 11, 2012], Internet <URL:http://www.openflow.org/documents/openflow-wp-latest.pdf>.
"OpenFlow Switch Specification," Version 1.1.0 Implemented (Wire Protocol 0x02), [online] [Searched on Jan. 11, 2012], Internet <URL:http://www.openflow.org/documents/openflow-spec-v1.1.0.pdf>.
Shinya Higuchi et al., Software Design, No. 248, pp. 114 to 119.

FIG. 5

| RELAY APPARATUS | PORT INFORMATION | ADJACENT RELAY APPARATUS | ADJACENT PORT INFORMATION |
|---|---|---|---|
| 1102 | P1 | NONE | NONE |
| 1102 | P2 | 1104 | P2 |
| 1102 | P3 | 1103 | P3 |
| : | : | : | : |
| 1103 | P1 | NONE | NONE |
| : | : | : | : |
| 1104 | P1 | NONE | NONE |

FIG. 6

| LAG IDENTIFICATION INFORMATION | MEMBER PORT INFORMATION | REPRESENTATIVE PORT |
|---|---|---|
| 1108 | P1 of 1102<br>P1 of 1103<br>P1 of 1104 | P1 of 1104 |
| : | : | : |

FIG. 7

| LAG IDENTIFICATION INFORMATION | TERMINAL INFORMATION |
|---|---|
| 1108 | MAC of 1101 |
| ... | ... |

FIG. 9

| RELAY APPARATUS | PORT | MATCH CONDITION | INSTRUCTIONS |
|---|---|---|---|
| 1102 | P1 | BC PACKET | FORWARD TO P3 AND P4 |
| 1102 | P4 | BC PACKET | FORWARD TO P1 AND P3 |
| 1102 | P3 | ANY (WILD CARD) | FORWARD TO P4 |
| 1103 | P1 | BC PACKET | FORWARD TO P2 AND P3 |
| 1103 | P2 | ANY (WILD CARD) | FORWARD TO P1 AND P3 |
| 1103 | P3 | ANY (WILD CARD) | FORWARD TO P1 AND P2 |
| 1104 | P1 | BC PACKET | FORWARD TO P3 AND P4 |
| 1104 | P3 | ANY (WILD CARD) | FORWARD TO P1 AND P4 |
| 1104 | P4 | BC PACKET | FORWARD TO P1 AND P3 |

FIG. 12

| RELAY APPARATUS | PORT | MATCH CONDITION | INSTRUCTIONS |
|---|---|---|---|
| 1102 | P1 | BC PACKET | FORWARD TO CONTROL APPARATUS |
| 1102 | P4 | BC PACKET | FORWARD TO P3 |
| 1102 | P3 | ANY (WILD CARD) | FORWARD TO P4 |
| 1103 | P1 | BC PACKET | FORWARD TO CONTROL APPARATUS |
| 1103 | P2 | ANY (WILD CARD) | FORWARD TO P3 |
| 1103 | P3 | ANY (WILD CARD) | FORWARD TO P2 |
| 1104 | P1 | BC PACKET | FORWARD TO CONTROL APPARATUS |
| 1104 | P3 | ANY (WILD CARD) | FORWARD TO P1 AND P4 |
| 1104 | P4 | BC PACKET | FORWARD TO P1 AND P3 |

FIG. 14

| RELAY APPARATUS | PORT | MATCH CONDITION | INSTRUCTIONS |
|---|---|---|---|
| 1102 | P3 | TRANSMISSION SOURCE MAC IS 1101 AND BC PACKET | FORWARD TO P4 |
| 1103 | P2 | TRANSMISSION SOURCE MAC IS 1101 AND BC PACKET | FORWARD TO P3 |
| 1103 | P3 | TRANSMISSION SOURCE MAC IS 1101 AND BC PACKET | FORWARD TO P2 |
| 1104 | P3 | TRANSMISSION SOURCE MAC IS 1101 AND BC PACKET | FORWARD TO P4 |

FIG. 15

| RELAY APPARATUS | PORT | MATCH CONDITION | INSTRUCTIONS |
|---|---|---|---|
| 1102 | P1 | TRANSMISSION SOURCE MAC IS 1101 AND BC PACKET | FORWARD TO P3 AND P4 |
| 1103 | P1 | TRANSMISSION SOURCE MAC IS 1101 AND BC PACKET | FORWARD TO P2 AND P3 |
| 1104 | P1 | TRANSMISSION SOURCE MAC IS 1101 AND BC PACKET | FORWARD TO P3 AND P4 |

CONTROL APPARATUS, COMMUNICATION SYSTEM, COMMUNICATION METHOD, AND PROGRAM

CROSS-REFERENCE TO RELATED APPLICATIONS

This application is a continuation of U.S. application Ser. No. 14/376,835, filed Aug. 5, 2014, which is a National Stage Entry of International Application No. PCT/JP2013/053079, filed Feb. 8, 2013, which is based upon and claims the benefit of priority of Japanese Patent Application No. 2012-026813 (filed on Feb. 10, 2012), the disclosure of which is incorporated herein in its entirety by reference.

TECHNICAL FIELD

The present invention relates to a control apparatus, a communication system, a communication method, and a program. More specifically, the invention relates to a control apparatus configured to perform centralized control over a relay apparatus, a communication system including the control apparatus, a communication method, and a program.

BACKGROUND

In recent years, the technology called OpenFlow (OpenFlow) is proposed (refer to Non Patent Literatures 1 and 2). OpenFlow identifies communications as end-to-end flows, and performs path control, failure recovery, load distribution, and optimization on a per-flow basis. An OpenFlow switch specified in Non Patent Literature 2 includes a secure channel for communication with an OpenFlow controller. The OpenFlow switch operates according to a flow table in which appropriate adding or rewriting is instructed by the OpenFlow controller. In the flow table, a set of a matching condition (Match condition) to be matched against a packet header, flow statistics information (Counters), and instructions (Instructions) defining processing content is defined for each flow (refer to section "4.1 Flow Table" in Non Patent Literature 2).

When the Open Flow switch receives a packet, for example, the OpenFlow switch searches the flow table for an entry having a matching condition that matches header information of the received packet (refer to "4.3 Match Fields" in Non Patent Literature 2). When the entry that matches the received packet is found as a result of the search, the OpenFlow switch updates the flow statistics information (one or more Counters), and executes processing content (e.g., transmission of the packet from a specified port, flooding of the packet, discarding of the packet, or the like) described in the instruction field of the entry. On the other hand, when the entry that matches the received packet is not found as a result of the search, the OpenFlow switch transmits to the OpenFlow controller a request for setting the entry, or a request for determining the processing content of the received packet, through the secure channel. The OpenFlow switch receives the flow entry in which the processing content is defined, and then updates the flow table. In this manner, the OpenFlow switch performs packet forwarding by using the entry stored in the flow table as a processing rule.

Patent Literature 1 discloses an invention in which physical ports belonging to a link aggregation group are also to be managed by an OpenFlow controller. A user can thereby be made to arbitrarily control the physical port of an output destination, without depending on a sorting algorithm or the like inside an apparatus including the physical ports belonging to the link aggregation group.

PATENT LITERATURE 1:
JP Patent Kokai Publication No. JP2011-160171A

NON-PATENT LITERATURE 1:
Nick McKeown and seven other authors, "OpenFlow: Enabling Innovation in Campus Networks," [online], [Searched on Jan. 11, 2012], Internet <URL: http://www.openflow.org/documents/openflow-wp-latest.pdf>.

[NON-PATENT LITERATURE 2]
"OpenFlow Switch Specification," Version 1.1.0 Implemented (Wire Protocol 0x02), [online] [Searched on Jan. 11, 2012], Internet <URL: http://www.openflow.org/documents/openflow-spec-v1.1.0.pdf>.

SUMMARY

Each disclosure of the related art literatures is incorporated herein by reference. The following analysis is given by the present invention. In a configuration where a link aggregation group is set on an OpenFlow network as in Patent Literature 1, however, there is a problem that, when a broadcast packet or a multicast packet flows into the OpenFlow network, the same packet is duplicately forwarded, depending on the behavior of a node at each end of the link aggregation group, so that traffic distribution cannot be performed according to a rule set for the link aggregation group.

Therefore, there is a need in the art to efficiently forward a broadcast packet and a multicast packet even in an environment where a link aggregation group is set on a network of a centralized control type represented by OpenFlow.

According to a first aspect, there is provided a control apparatus, comprising: a topology management unit that manages a network topology formed by including a plurality of relay apparatuses; a link aggregation group management unit that groups ports of the plurality of relay apparatuses, having a physical link with an arbitrary node of the network topology, and manages the grouped ports as a port of a virtual logical link between the plurality of relay apparatuses and the arbitrary node; and a relay apparatus control unit that controls the plurality of relay apparatuses, having the grouped ports, so that, when one of the plurality of relay apparatuses receives a broadcast packet or a multicast packet, a plurality of same packets are not forwarded to the physical links that form the virtual logical link.

According to a second aspect, there is provided a communication system that comprises: the above control apparatus; and a relay apparatus that is controlled by the control apparatus.

According to a third aspect, there is provided a communication method by a control apparatus comprising a topology management unit that manages a network topology formed by including a plurality of relay apparatuses, the communication method comprising: grouping ports of the plurality of relay apparatuses, having a physical link with an arbitrary node of the network topology, and managing the grouped ports as a port of a virtual logical link between the plurality of relay apparatuses and the arbitrary node; and controlling the plurality of relay apparatuses, having the grouped ports, so that when one of the plurality of relay apparatuses receives a broadcast packet or a multicast packet, a plurality of same packets are not forwarded to the physical links that form the virtual logical link.

According to a fourth aspect, there is provided a program for a computer constituting a control apparatus comprising a topology management unit that manages a network topology formed by including a plurality of relay apparatuses, the program causing the computer to execute: grouping ports of the plurality of relay apparatuses, having a physical link with an arbitrary node of the network topology, and storing the grouped ports as a port of a virtual logical link between the plurality of relay apparatuses and the arbitrary node; and controlling the plurality of relay apparatuses, having the grouped ports, so that, when one of the plurality of relay apparatuses receives a broadcast packet or a multicast packet, a plurality of same packets are not forwarded to the physical links that form the virtual logical link.

The present invention provides the following advantage, but not restricted thereto. According to the present invention, even under an environment where a link aggregation group has been set on the network of a centralized control type represented by OpenFlow, a broadcast packet and a multicast packet can be efficiently forwarded.

BRIEF DESCRIPTION OF THE DRAWINGS

FIG. 5 is a table showing an example of a topology table held in the control apparatus in the first exemplary embodiment of the present invention.

FIG. 6 is a table showing an example of a LAG port management table held in the control apparatus in the first exemplary embodiment of the present invention.

FIG. 7 is a table showing an example of a LAG terminal management table held in the control apparatus in the first exemplary embodiment of the present invention.

FIG. 9 shows an example of control information set in each relay apparatus (before LAG port formation) in the first exemplary embodiment of the present invention.

FIG. 12 shows an example of control information set in each relay apparatus (after the LAG registration reception and the path re computation) in the first exemplary embodiment of the present invention.

FIG. 14 shows an example of control information set in each relay apparatus (for preventing forwarding to any LAG port) in the first exemplary embodiment of the present invention.

FIG. 15 shows an example of control information set in each relay apparatus (when receiving from one of LAG ports) in the first exemplary embodiment of the present invention.

PREFERRED MODES

In the present disclosure, there are various possible modes, which include the following, but not restricted thereto. First, an overview of an exemplary embodiment of the present invention will be described with reference to the drawings. In the following description, a reference sign in each drawing appended to this overview is appended to each element for convenience, as an example for help understanding, and does not intend to limit the present invention to the mode that has been illustrated.

Figure 1:
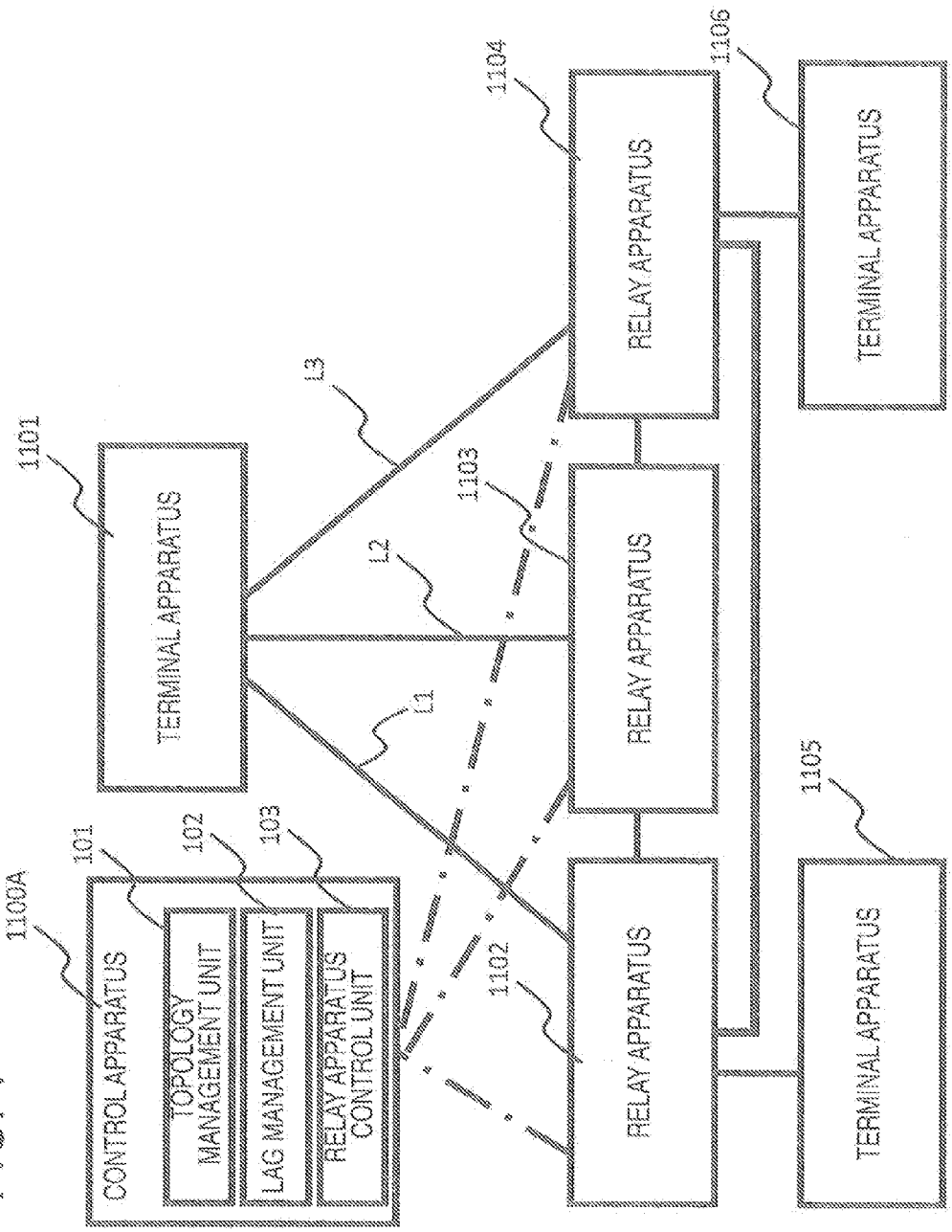
FIG. 1 is a diagram showing an example of a configuration of an exemplary embodiment of the present invention.

As shown in FIG. 1, the exemplary embodiment of the present invention can be implemented by a plurality of relay apparatuses 1102 to 1104 configured to relay a packet between terminal apparatuses 1101, 1105, and 1106 and a control apparatus 1100A configured to control these relay apparatuses 1102 to 1104.

More specifically, the control apparatus 1100A comprises a topology management unit 101 that manage a network topology formed by including a plurality of relay apparatuses 1102 to 1104; a link aggregation group management unit (LAG management unit) 102 that groups ports of the plurality of relay apparatuses, having a physical link with an arbitrary node of the network topology, and manages the grouped ports as a virtual logical link between the plurality of the relay apparatuses and the arbitrary node; and a relay apparatus control unit 103 that controls the plurality of relay apparatuses. The relay apparatus control unit 103 controls the plurality of relay apparatuses, having the grouped ports, so that, when one of the plurality of relay apparatuses receives a broadcast packet or a multicast packet, a plurality of same packets are not forwarded to the physical links that form the virtual logical link.

Figure 2:
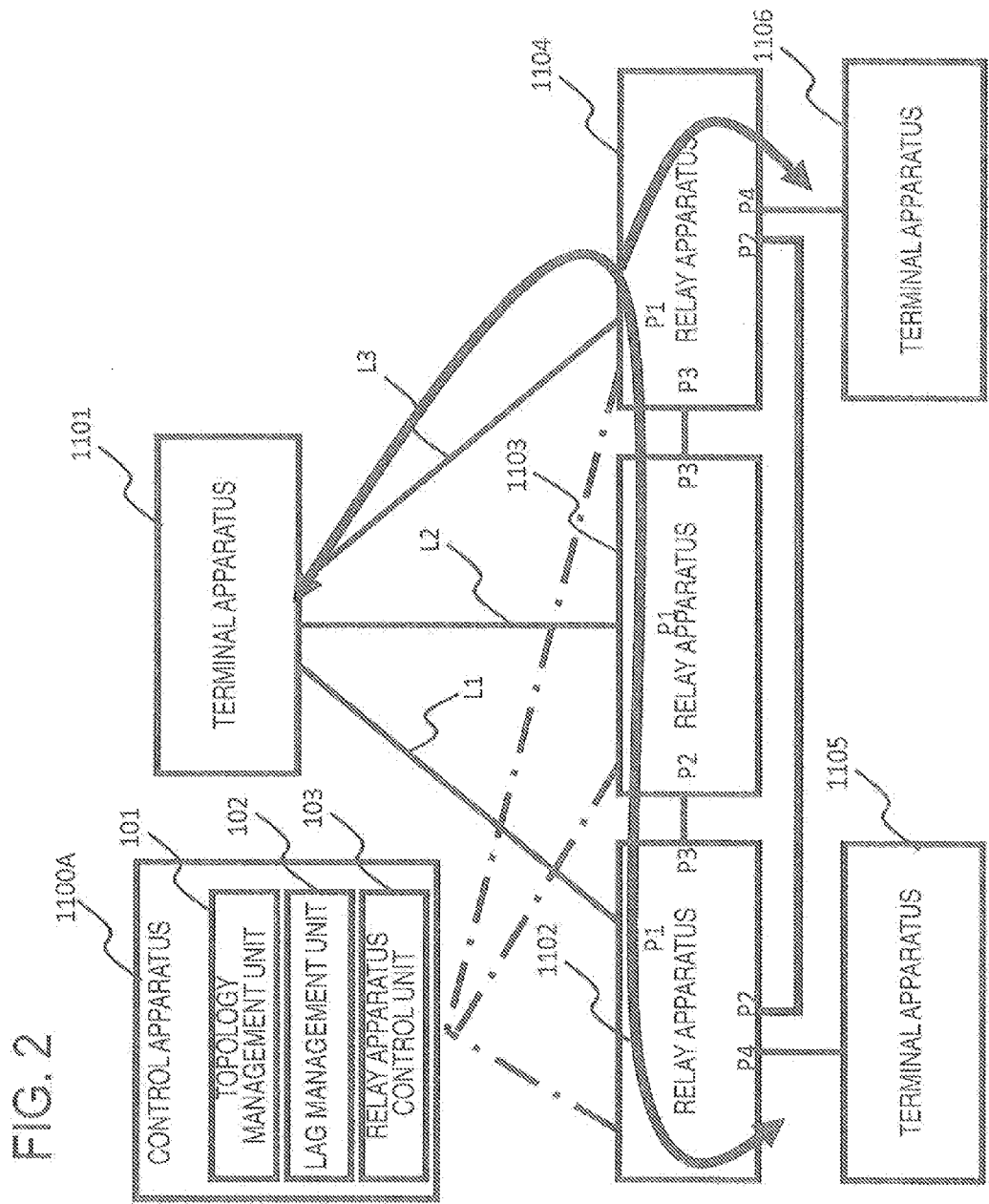
FIG. 2 is a diagram for explaining an example of an operation of the exemplary embodiment of the present invention.

Assume that a link aggregation group (LAG) is formed by grouping ports of the relay apparatuses 1102 to 1104 connected to the terminal apparatus 1101 through physical links L1 to L3 as shown in FIG. 2, for example. Then, the relay apparatus control unit 103 controls the plurality of relay apparatuses, each having a port among the grouped ports, so that, when one of the relay apparatuses receives a broadcast packet or a multicast packet, a plurality of same packets are not forwarded to a plurality of the physical links that form the virtual logical link.

More specifically, the relay apparatus control unit 103 controls the relay apparatuses 1101 to 1103 so that the broadcast packet or the multicast packet is forwarded along a path including a predetermined representative one of the ports (link L3 using the representative port as an end point) and does not pass through the ports (end points of the links L1 and L2), which are not the representative port, as shown in arrowed lines in FIG. 2.

With the above-mentioned arrangement, the broadcast packet and the multicast packet can be efficiently forwarded even under an environment where the link aggregation group has been set.

First Exemplary Embodiment

Figure 3:
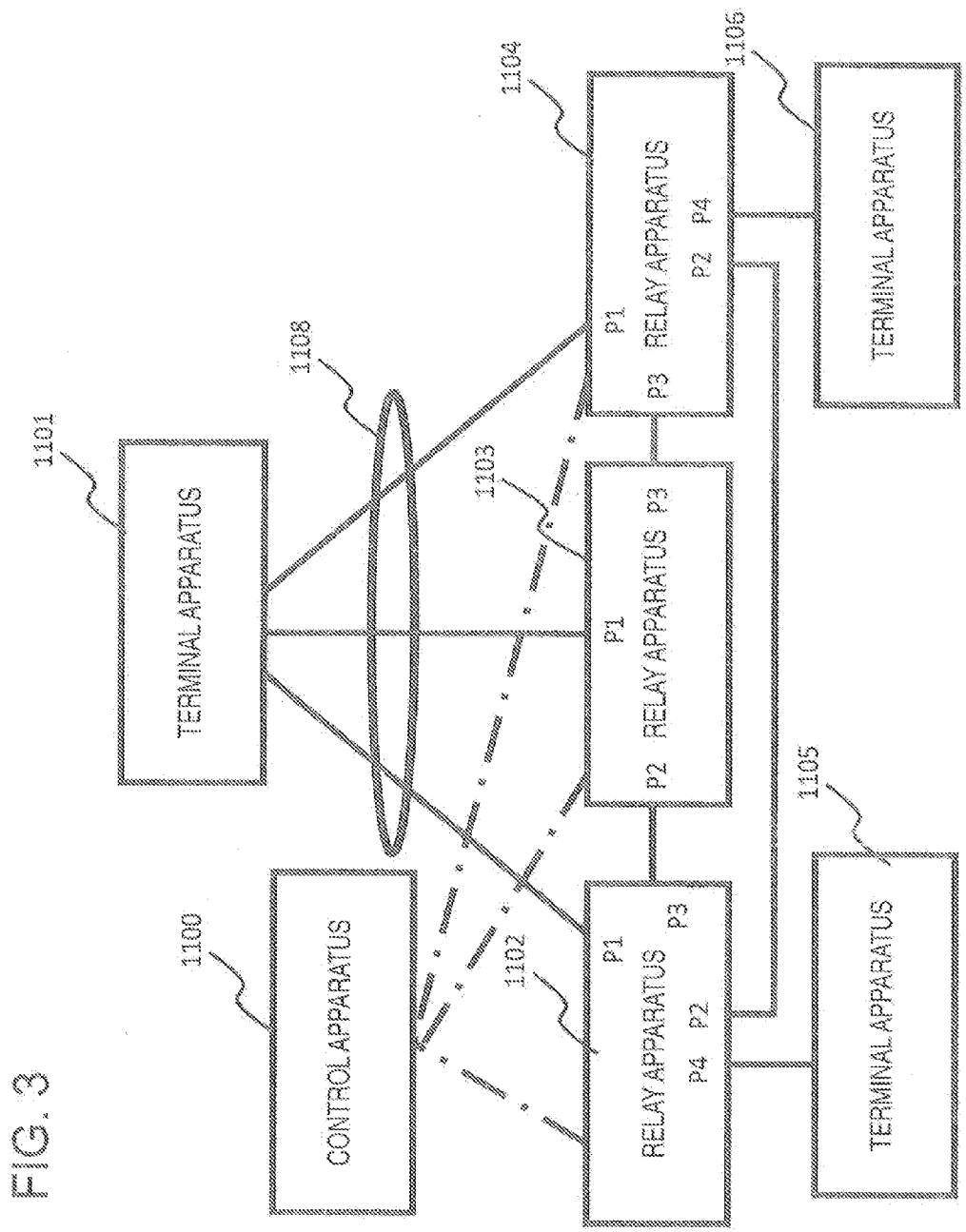
FIG. 3 is a diagram showing an example of a configuration of a first exemplary embodiment of the present invention.

Next, a first exemplary embodiment of the present invention will be described in detail with reference to the drawings. FIG. 3 is a diagram showing an example of a configuration of the first exemplary embodiment of the present invention. Referring to FIG. 3, the configuration including terminal apparatuses 1101, 1105, and 1106, relay apparatuses 1102, 1103, and 1104, and a control apparatus 1100 is shown. The terminal apparatuses 1101, 1105, and 1106 are configured to perform mutual communication through a network. The relay apparatuses 1102, 1103, and 1104 are each configured to forward a packet transmitted from each of the terminal apparatuses as a communication path between the respective terminal apparatuses 1101, 1105, and 1106. The control apparatus 1100 is configured to be connected to each of the relay apparatuses 1102, 1103, and 1104 through a control channel (indicated by a dashed line in FIG. 3) and controls the relay devices 1102, 1103, and 1104. A reference sign 1108 in FIG. 3 represents a link aggregation group.

The relay apparatuses 1102, 1103, and 1104 can be formed by an OpenFlow switch described in each of Non-Patent Documents 1 and 2, for example. Another switching apparatus capable of forwarding a packet based on control information from the control apparatus 1100 can also be used. Each of reference signs P1 to P4 shown within boxes indicating the relay apparatuses 1102, 1103, and 1104 indicates a port number of each relay apparatus.

The terminal apparatuses 1101, 1105, and 1106 are a computer to be operated by a user of the network, a server configured to provide a service and content to these computers, or the like.

Figure 4:
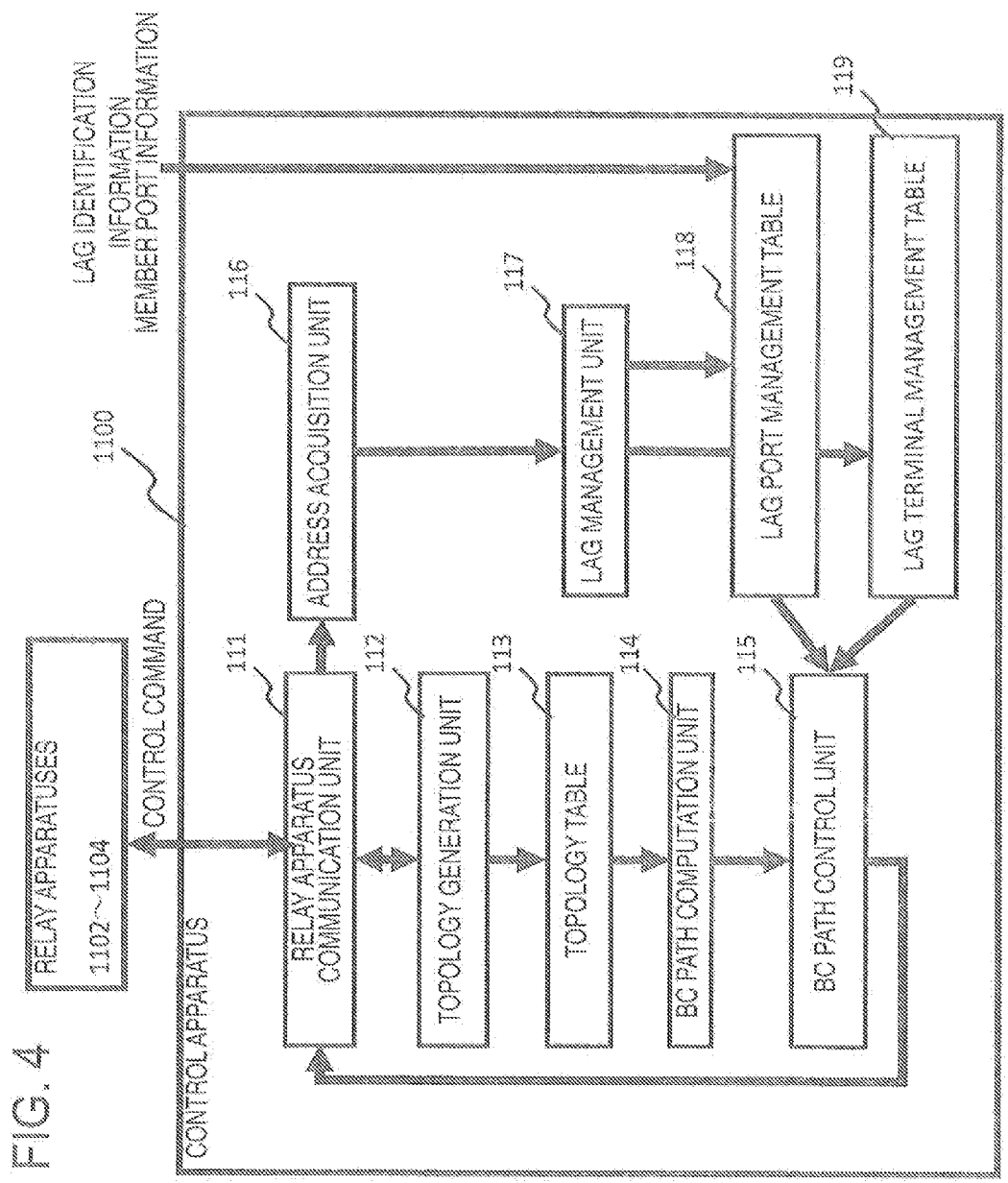
FIG. 4 is a block diagram showing an example of a detailed configuration of a control apparatus in the first exemplary embodiment of the present invention.

FIG. 4 is a block diagram showing a detailed configuration of the control apparatus in the first exemplary embodiment of the present invention. Referring to FIG. 4, the configuration is shown which includes a relay apparatus communication unit 111, a topology generation unit 112, a topology table 113, a broadcast path computation unit (BC path computation unit) 114, a broadcast path control unit (BC path control unit) 115, an address acquisition unit 116, a link aggregation group management unit (LAG management unit) 117, a link aggregation group port management table (LAG port management table) 118, and a link aggregation group terminal management table (LAG terminal management table) 119.

The relay apparatus communication unit 111 transmits a control command to each of the relay apparatuses 1102 to 1104 in response to a request from the topology generation unit 112 or the BC path control unit 115. The relay apparatus communication unit 111 forwards a response from each of the relay apparatuses 1102 to 1104 to the topology generation unit 112 and the BC path control unit 115.

The topology generation unit 112 requests connection information of each relay apparatus to each of the relay apparatuses 1102 to 1104 through the relay apparatus communication unit 111, generates a network topology based on a result of response of each of the relay apparatuses 1102 to 1104, and then records the generated network topology in the topology table 113. As a collection method of the connection information, a method may be pointed out where a specific one of the relay apparatuses is made to transmit a packet for arrival confirmation to all ports, a result of receiving the packet for arrival confirmation is stored in each relay apparatus, and then the control apparatus 1100 reads the connection information between the respective relay apparatuses, based on the stored result of receiving the packet. Alternatively, a method may be employed where receipt of the packet for arrival confirmation is notified to the control apparatus 1100 by each relay apparatus without storing the result of receiving the packet for arrival confirmation in the relay apparatus. As a typical protocol of this type, there is an LLDP (Link Layer Discovery Protocol). However, other protocols may be employed. Alternatively, a method may be used where the topology generation unit 112 receives an input of topology information from the user and registers the topology information in the topology table 113.

FIG. 5 shows an example of the topology table corresponding to the network configuration in FIG. 3. Referring to FIG. 3, the port P1 of the relay apparatus 1102 is connected to the terminal apparatus 1101. Thus, referring to FIG. 5, an adjacent relay apparatus of the relay apparatus 1102 and information on an adjacent port of the relay apparatus 1102 are both "None." On the other hand, the port P2 of the relay apparatus 1102 is connected to the relay apparatus 1104. Thus, referring to FIG. 5, the adjacent relay apparatus of 1104 and the adjacent port information of P2 (indicating that the relay apparatus 1102 is opposed to the port P2 of the adjacent relay apparatus 1104) are obtained.

The BC path computation unit 114 computes a broadcast path starting from each of the terminal apparatuses 1101, 1105, and 1106, by referring to the network topology registered in the topology table 113. As a computation method of the broadcast path, a minimum spanning tree (of which a Prim's algorithm and a Kruskal's algorithm are representative) or the like may be employed.

The BC path control unit 115 corresponds to the relay apparatus control unit 103 in FIG. 1 mentioned above, generates control information for executing a packet forwarding along the broadcast path computed by the BC path computation unit 114, and sets the control information in the relay apparatuses 1102 to 1104 through the relay apparatus communication unit 111. Even when the LAG port management table 118 or the LAG terminal management table 119 is updated, the BC path control unit 115 performs control information resetting in view of the presence of the LAG and the representative port of the LAG, according to the procedure that will be described later.

Though omitted in the description of this exemplary embodiment, the BC path computation unit 114 and the BC path control unit 115 may compute a unicast path and may set control information for unicast in response to a request from each of the relay apparatuses 1102 to 1104 through the relay apparatus communication unit 111.

The address acquisition unit 116 extracts the transmission source address and the transmission destination address of the packet from the relay apparatus communication unit 111, and then outputs the extracted transmission source and destination addresses to the LAG management unit 117.

The LAG management unit 117 manages information for identifying the link aggregation group (hereinafter referred to as "LAG identification information") and each terminal apparatus connected to the link aggregation group, using the LAG port management table 118 and the LAG terminal management table 119. The LAG management unit 117 selects, from among the ports of the relay apparatuses of the LAG to which the LAG identification information has been given (hereinafter referred to as "member ports"), one port representative of the member ports (hereinafter referred to as the "representative port"). The representative port may be selected, using an appropriate algorithm in view of equalization of traffic at each member port and a link cost.

The LAG port management table 118 is a table for managing the configuration, which indicates LAG port information and so forth. FIG. 6 shows an example of the LAG port management table 118. In the example in FIG. 6, the LAG using, as the member ports, the ports (ports PI of the relay apparatuses 1102 to 1104) of the relay apparatuses (e.g., the relay apparatuses 1102 to 1104 in FIG. 3) connected to a certain one of the terminal apparatuses (e.g., the terminal apparatus 1101 in FIG. 3) is registered. The port P1 of the relay apparatus 1104 is selected as the representative port of this LAG.

The LAG terminal management table 119 is a table for managing each terminal connected to the LAG. FIG. 7 shows an example of the LAG terminal management table 119. In the example in FIG. 7, the MAC (Media Access Control) address of the terminal apparatus 1101 is associated with the LAG identification information of "1108" described above. This corresponds to a state where the terminal apparatus 1101 is connected to the LAG 1108.

Each unit (processing means) of the control apparatus 1100 shown in FIG. 4 can also be implemented by a computer program that causes a computer which constitutes the control apparatus 1100 to execute each of processes described above, using hardware of the computer.

Next, an example of an operation of this exemplary embodiment will be described in detail with reference to the drawings. First, generation of the network topology and setting of the broadcast path by the control apparatus 1100 (before registration of the LAG) will be described.

Figure 8:
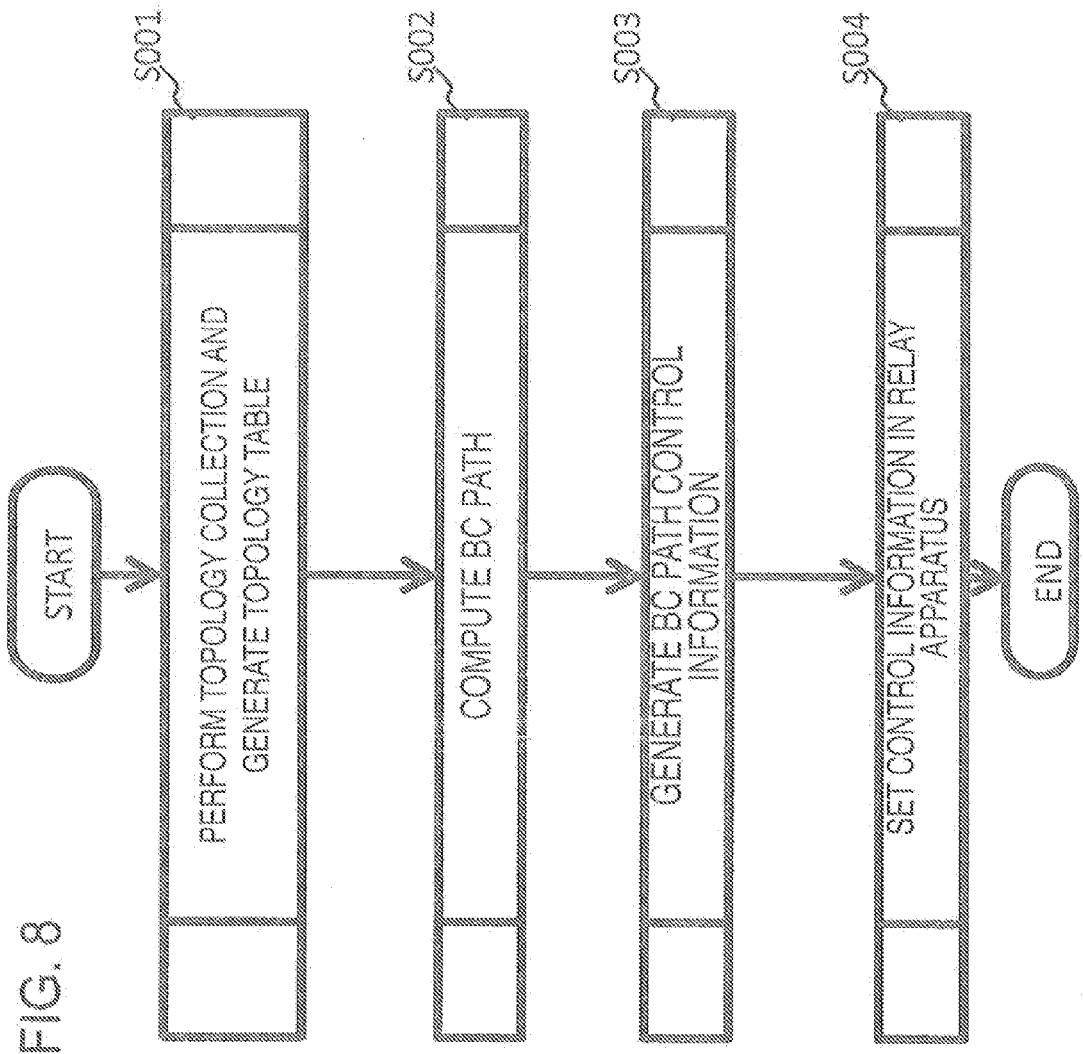
FIG. 8 is a flowchart showing an example of an operation (before registration of a LAG) in the first exemplary embodiment of the present invention*

FIG. 8 is a flowchart showing an example of an operation of the first exemplary embodiment (before registration of the LAG). Referring to FIG. 8, the topology generation unit 112 first collects the connection information between the respective relay apparatuses through the relay apparatus communication unit 111, thereby generating the network topology (in step S001). The topology generation unit 112 records the generated topology in the topology table 113.

Next, the BC path computation unit 114 computes the broadcast path, by referring to the topology table 113 (in step S002).

Next, the BC path control unit 115 generates the control information for each of the relay apparatuses 1102 to 1104, according to a result of computation of the broadcast path by the BC path computation unit 114 (in step S003). It is assumed in this exemplary embodiment that a flow entry which associates match fields (Match Fields) to be checked against a received packet and instructions (Instructions) configured to define processing content is generated, as the control information.

Next, the BC path control unit 115 requests transmission of the generated control information to the relay apparatus communication unit 111. The relay apparatus communication unit 111 that has received the request sets the control information in the relay apparatuses (in step S004). In this case, the BC path control unit 115 may set in each relay apparatus the control information for causing a specific one of broadcast packets to be forwarded to the control apparatus 1100. As the specific one of the broadcast packets, an ARP (Address Resolution Protocol) packet, or an LACP (Link Aggregation Control Protocol) packet, for example, may be pointed out. This allows recognition of each terminal apparatus and execution of a negotiation with respect to link aggregation.

FIG. 9 shows an example of the control information generated by the BC path control unit 115. The first to third ones of the control information from the top of FIG. 9 are set in the relay apparatus 1102. Similarly, the fourth to sixth ones of the control information from the top of FIG. 9 are set in the relay apparatus 1103, and the seventh to ninth ones of the control information from the top of FIG. 9 are set in the relay apparatus 1104. When the relay apparatus 1102 receives a broadcast packet (hereinafter referred to as a "BC" packet) at the port P1, for example, the relay apparatus 1102 confirms that the BC packet matches a Match condition (being a BC packet), and forwards the BC packet to the ports P3 and P4. The BC packet transmitted from the port P4 of the relay apparatus 1102 arrives at the terminal apparatus 1105. On the other hand, the BC packet transmitted from the port P3 of the relay apparatus 1102 is received at the port P2 of the relay apparatus 1103. When the relay apparatus 1103 receives the broadcast packet (hereinafter referred to the "BC packet") at the port P2, the relay apparatus 1103 confirms that the BC packet matches a Match condition (being Any (not specified)), and forwards the BC packet to the ports P1 and P3. Hereinafter, similarly, the BC packet arrives at every node.

Next, an operation of resetting (optimizing) control information after the link aggregation has been registered by the user will be described.

Figure 10:
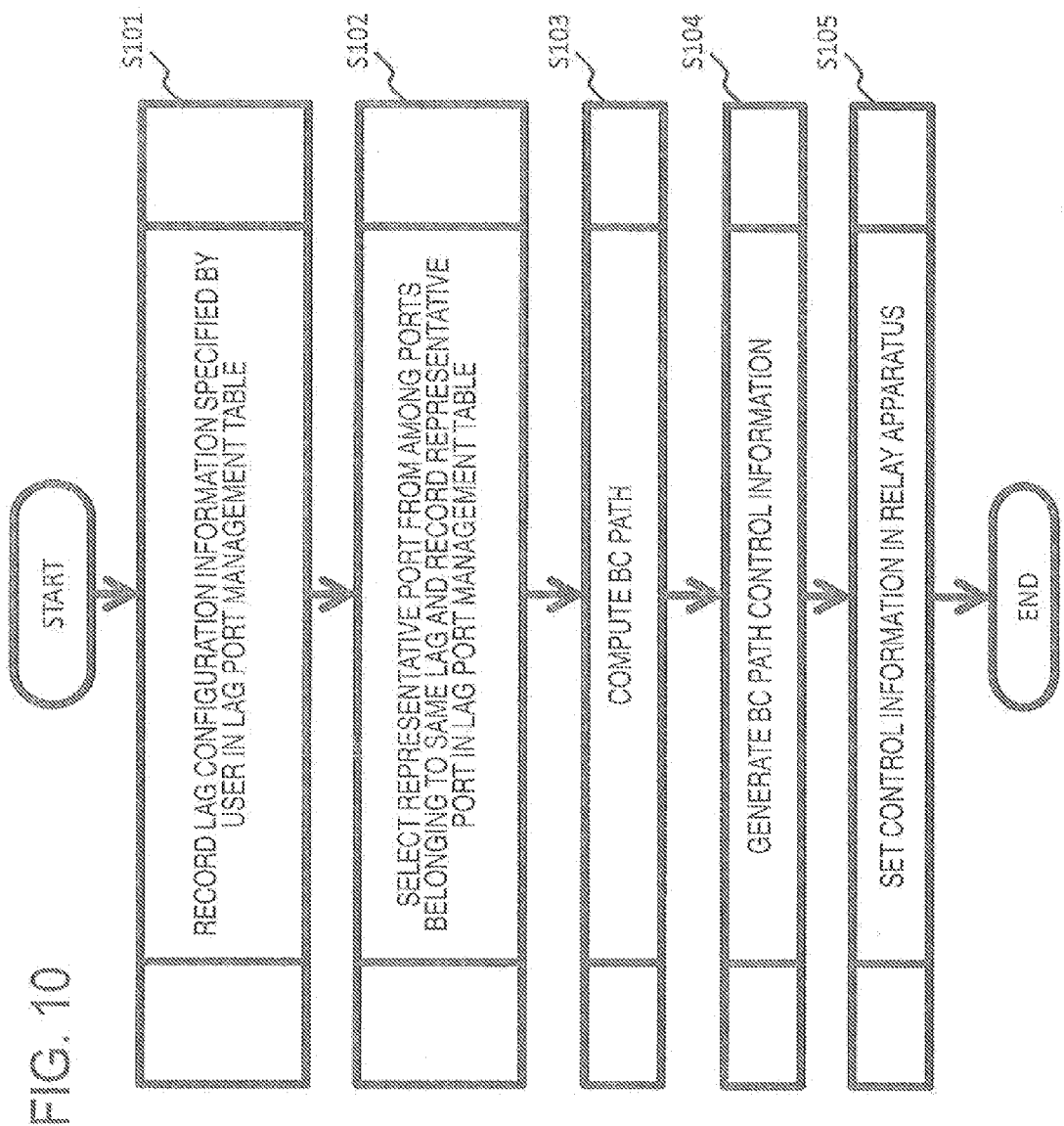
FIG. 10 is a flowchart showing an example of an operation (of a LAG registration reception and path recomputation) in the first exemplary embodiment of the present invention.

FIG. 10 is a flowchart showing an example of an operation (of receiving registration of the LAG and recomputing a path) in the first exemplary embodiment. Referring to FIG. 10, the LAG management unit 117 first records in the LAG port management table 118 LAG configuration information (formed of the LAG identification information and member port information) specified by the user (in step S101). It is herein assumed that the LAG configuration information formed of the LAG identification information of 1108 and the member port information of P1 of (the relay apparatus) 1102, P1 of (the relay apparatus) 1103, and P1 of (the relay apparatus) 1104 are recorded, as shown in FIG. 6.

Next, the LAG management unit 117 selects the representative port from the ports belonging to the same LAG, and records the representative port in the LAG port management table 118 in step S102). It is assumed herein that the port PI of (the relay apparatus) 1104 has been selected as the representative port.

Figure 11:
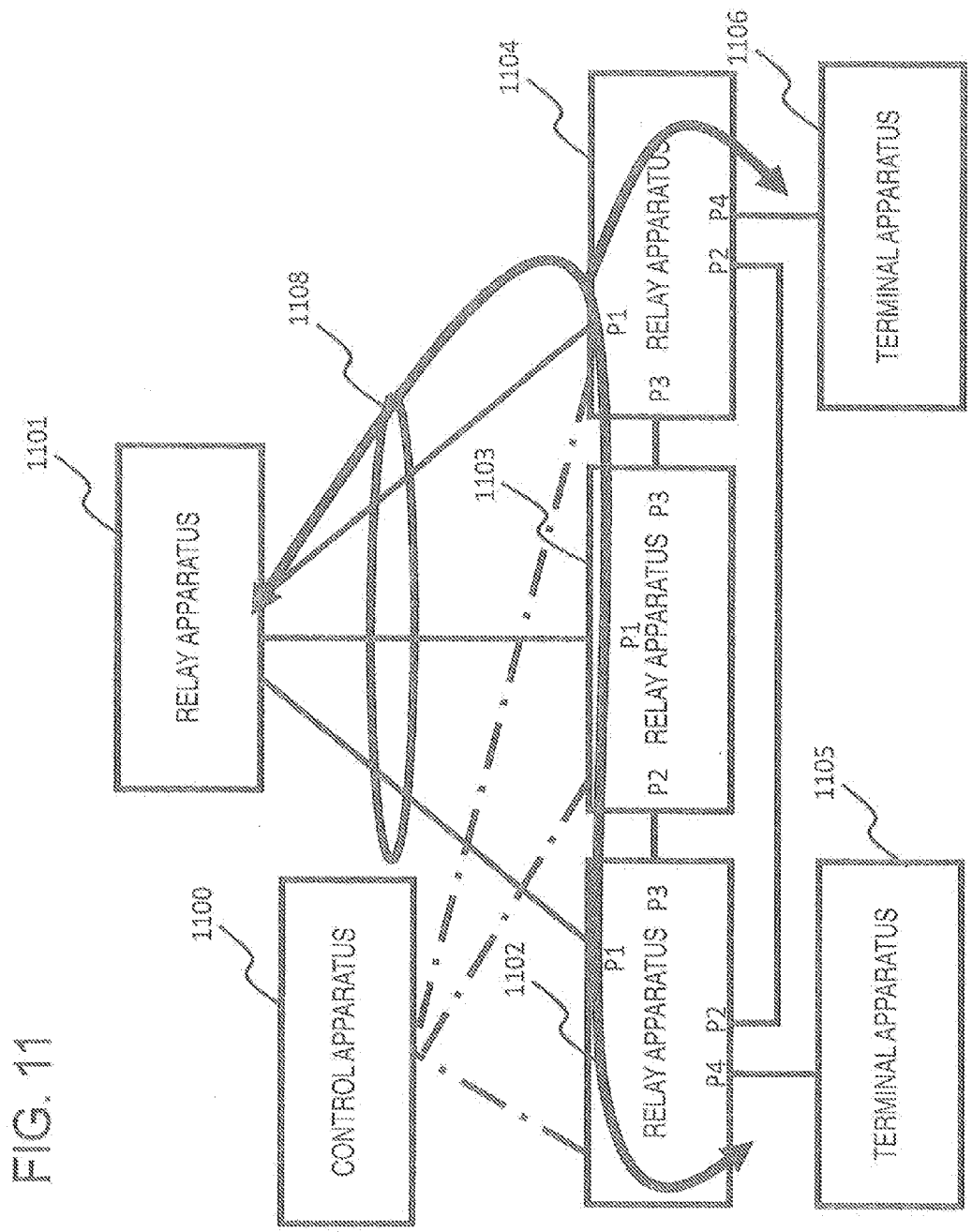
FIG. 11 is a diagram showing an example of computation of a broadcast path that passes through a representative port.

Next, the BC path computation unit 114 computes a broadcast path, by referring to the topology table 113 and the LAG port management table 118 (in step S103). FIG. 11 is a diagram showing the broadcast path so computed as to pass through the selected representative port.

Next, the BC path control unit 115 generates the control information for implementing packet forwarding along the computed broadcast path (in step S104). In this case, the BC path control unit 115 excludes the ports other than the representative port of the ports (member ports) belonging to the same LAG from a distribution destination.

Finally, the BC path control unit 115 requests the relay apparatus communication unit 111 to transmit the generated control information. The relay apparatus communication unit 111 that has received the request sets the control information in the relay apparatuses (in step S105).

FIG. 12 shows an example of the control information generated by the BC path control unit 115. The control information in FIG. 12 is different from the control information shown in FIG. 9 in that when a BC packet is received at the member port P1, the packet is forwarded to the control apparatus 1100 and that the ports P1 are deleted from the port of the forwarding destination (refer to broken-line circles in FIG. 12), which is associated with the broadcast path in FIG. 11. Setting of these control information can also be implemented by requesting rewriting of Instructions Fields of these control information when the control information shown in FIG. 9 has already been set in each of the relay apparatuses 1102 to 1104.

In the example in FIG. 12, when the relay apparatus 1104 receives a BC packet at the port P4, the relay apparatus 1102 confirms that the BC packet matches a Match condition (being a BC packet), and then forwards the BC packet to the port P1 and the port P3. The BC packet transmitted from the port P1 of the relay apparatus 1104 arrives at the terminal apparatus 1101. On the other hand, the BC packet transmitted from the port P3 of the relay apparatus 1104 is received at the port P3 of the relay apparatus 1103. When the relay apparatus 1103 receives the broadcast packet (hereinafter referred to as the "BC packet") at the port P3, the relay apparatus 1103 confirms that the BC packet matches a Match condition (being Any (not specified)), and forwards the BC packet to the port P2. Hereinafter, similarly, the BC packet arrives at every node.

Next, a description will be given about an operation when a BC packet is transmitted from the terminal apparatus 1101 connected to the LAG in a state where the control information as mentioned above has been set.

When the BC packet is transmitted from the terminal apparatus 1101, the BC packet is received at one of the member ports P1 of the relay apparatuses 1102 to 1104 that form the LAG. The BC packet is then forwarded to the control apparatus 1100 as shown in the control information in FIG. 12 described above.

Figure 13:
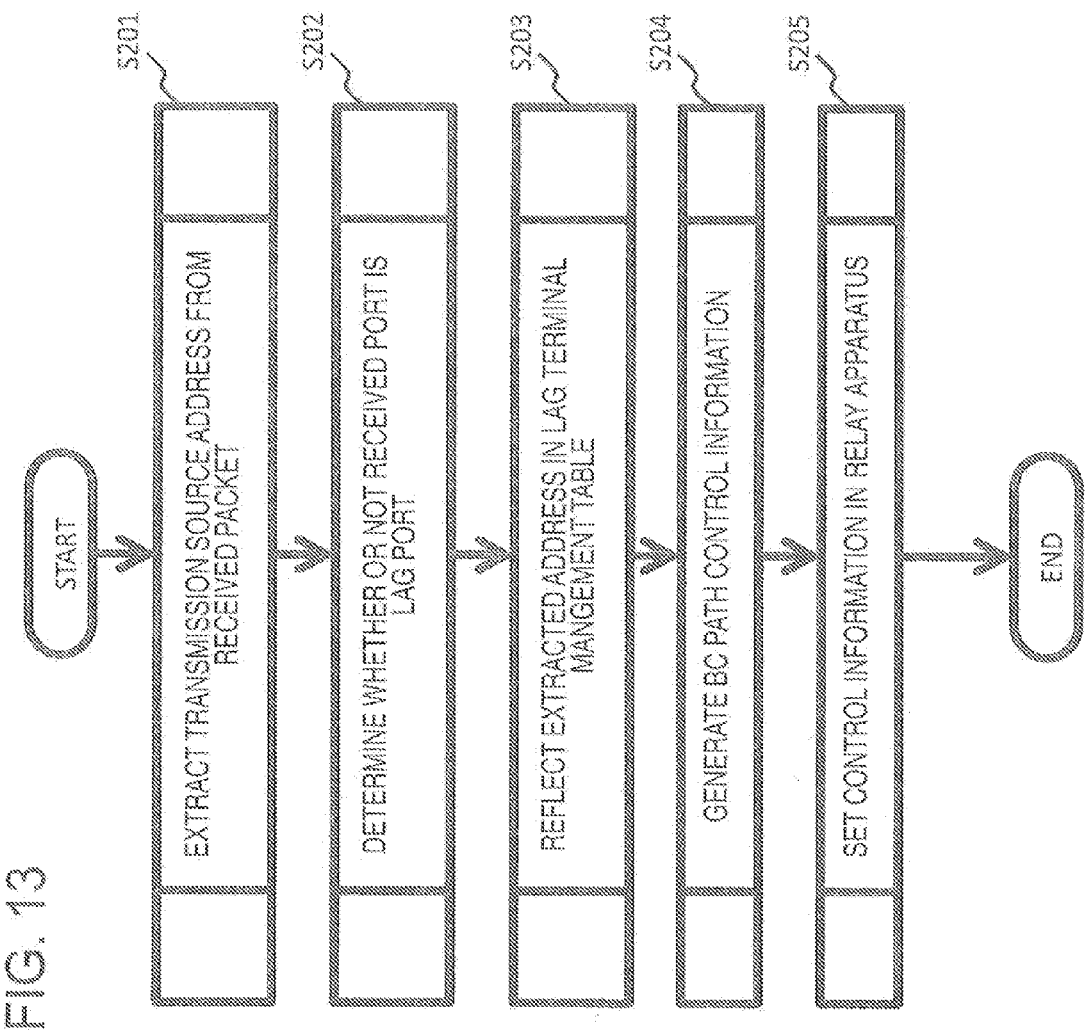
FIG. 13 is a flowchart showing an example of an operation (of setting LAG port control information) in the first exemplary embodiment of the present invention.

FIG. 13 is a flowchart showing an example of an operation of the control apparatus 1100 (of setting LAG port control information) when a BC packet is received from the terminal apparatus 1101 connected to the above-mentioned LAG. Referring to FIG. 13, when the control apparatus 1100 receives the BC packet, the address acquisition unit 116 obtains transmission source address information from the received BC packet, and notifies the transmission source address information to the LAG management unit 117 together with information on the relay apparatus and the port of the relay apparatus for the transmission source of the BC packet (in step S201). It is assumed herein that the address information of the terminal apparatus 1101 in FIG. 3 is obtained.

Next, the LAG management unit 117 checks whether or not the BC packet has been received at the port belonging to the LAG, by referring to the LAG port management table 118 (in step S202). Herein, when the BC packet is not received at the port belonging to the LAG, subsequent processes are omitted.

Next, the LAG management unit 117 associates and registers in the LAG terminal management table 119 the LAG identification information with the address of the transmission source notified from the address acquisition unit 116 (in step S203).

Further, the LAG management unit 117 requests the BC path control unit 115 to generate the control information for processing the BC packet from the terminal apparatus connected to the LAG (in step S204). The BC path control unit 115 that has received the request additionally generates the following two types of the control information.

A first one of the control information is control information (hereinafter referred to as "transmission source filtering BC") configured not to forward to the representative port of the LAG a packet with the address of the terminal apparatus (terminal apparatus 1101, herein) connected, to the LAG port as transfer source information, when the packet is received at the port of the relay apparatus to which the representative port of the same LAG belongs.

FIG. 14 shows an example of the control information (transmission source filtering BC) to be generated by the BC path control unit 115. A difference from the control information for the same port of a same one of the relay apparatuses shown in FIG. 12 is that, as each Match condition, the MAC address of the relay apparatus 1101 (that can be obtained from the LAG terminal management table 119) is set, and that the port P1 is excluded from a forwarding destination. With this arrangement, a BC packet transmitted from the terminal apparatus 1101 is not forwarded to any one of the member ports, thereby avoiding a loop.

A second one of the control information is control information (hereinafter referred to as "transmission source permitting BC") configured to cause packet forwarding to be performed along the broadcast path when a BC packet using the MAC address of the terminal apparatus 1101 connected to the LAG as a transfer source is received at one of the member ports of the LAG.

FIG. 15 shows an example of the control information (transmission source permitting BC) generated by the BC path control unit 115. With this arrangement, a B C packet from the terminal apparatus 1101 connected to the LAG is forwarded to a different one of the relay apparatuses or a different one of the terminal apparatuses.

A higher priority than the control information shown in FIG. 12 is given to each of the first control information in FIG. 14 and the second control information in FIG. 15. As a method of giving the priority, priority information may be given to each control information, or storage positions of the first control information and the second control information may be instructed so that the first control information and the second control information are searched at each relay apparatus earlier than the control information shown in FIG. 12.

Finally, the BC path control unit 115 requests the relay apparatus communication unit 111 to transmit the generated first and second control information (transmission source filtering BC and transmission source permitting BC). The relay apparatus communication unit 111 that has received the request sets the control information in the relay apparatuses (in step S205).

By setting the first and second control information as described above, when each relay apparatus receives a BC packet, each relay apparatus can be controlled not to flow the same BC packet into links that form the LAG.

According to the configuration of this exemplary embodiment, the same control can be continued even if a failure has occurred at the representative port of a LAG. A detailed description will be given below about operations when the failure has occurred at the representative port of the LAG, with reference to the drawing.

Figure 16:
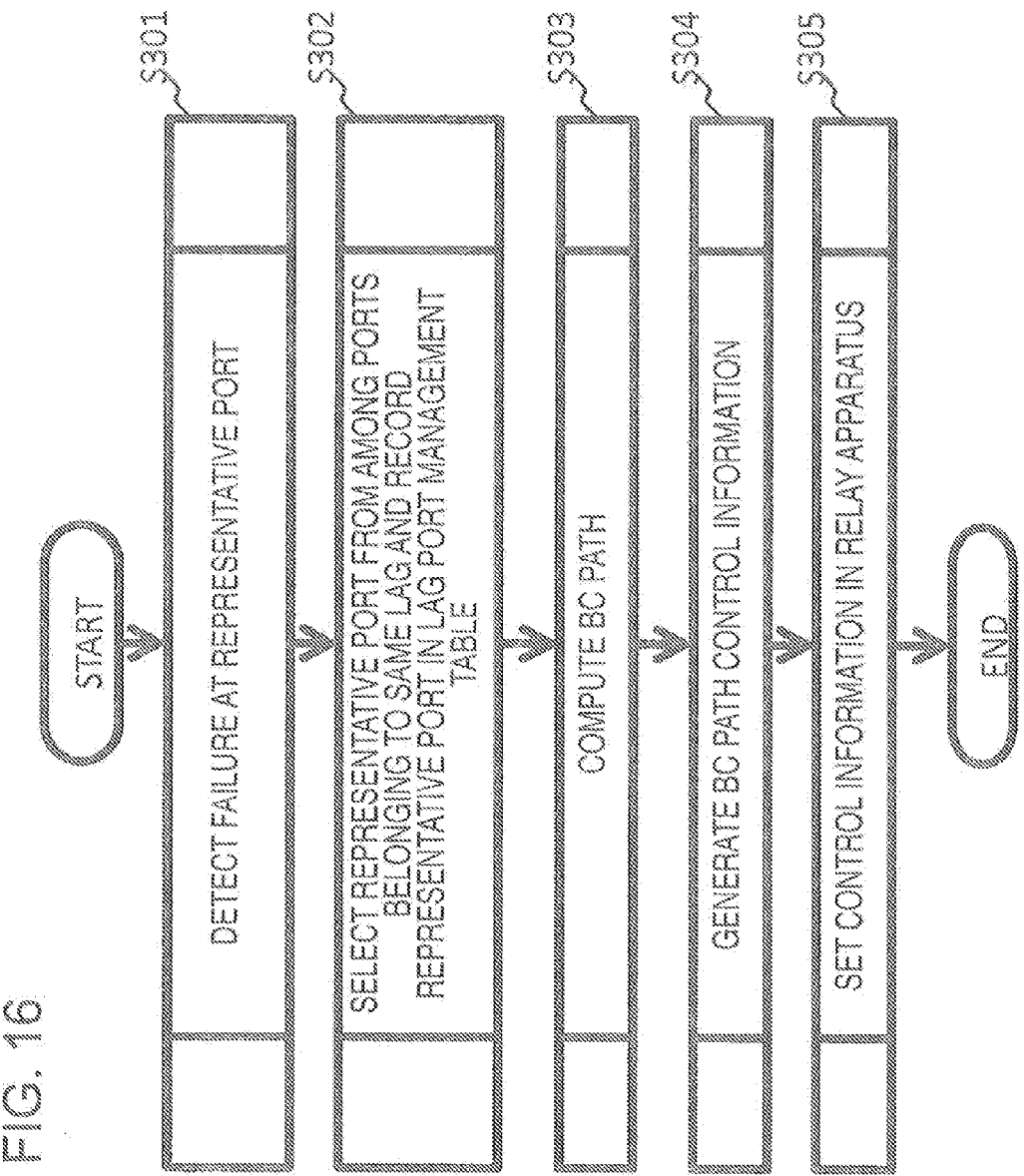
FIG. 16 is a flowchart showing an example of an operation (of resetting control information when a LAG port failure has occurred) in the first exemplary embodiment of the present invention.

FIG. 16 is a flowchart showing an example of an operation of the control apparatus 1100 (of resetting control information when the failure has occurred at the LAG port) when the failure has occurred at the representative port of the LAG. Referring to FIG. 16, the LAG management unit 117 detects the failure at the representative port (in step S301). The failure of the representative port can be detected by collection of the connection information between the respective relay apparatuses by the topology generation unit 112, notification from each terminal apparatus, or the like, for example.

Next, the LAG management unit 117 refers to the LAG port management table, selects a representative port from the member ports of the LAG where the failure has occurred at the representative port, and records the representative port in the LAG port management table 118 (in step S302).

Since the subsequent operations are the same as the content described with reference to FIG. 10 (in steps S303 to S305). In this case as well, the procedure shown in FIG. 13 is performed to set first control information and second control information (transmission source filtering BC and transmission source permitting BC), if needed. As described above, the present invention achieves effects as will be described below.

As described above, according to this exemplary embodiment, even under an environment where a LAG has been set on a network of a centralized control type represented by OpenFlow, a BC packet can be efficiently forwarded. Further, traffic between a terminal apparatus and relay apparatuses connected to the LAG can also be finely distributed, using the above-mentioned algorithm of selecting a representative port.

Though the above description was directed to the exemplary embodiment of the present invention, the present invention is not limited to the above-mentioned exemplary embodiment. Further variation, substitution, and adjustment can be added within the scope not departing from the basic technical concept of the present invention. To take an example, the description of the above-mentioned exemplary embodiment was given, assuming that a broadcast packet is to be handled. The present invention, however, can be similarly applied to a multicast packet as well.

The numbers of the control apparatus, the terminal apparatuses, and the relay apparatuses and the configuration of the network illustrated in the above-mentioned exemplary embodiment are an example shown to help understanding of the present invention. No particular limitation is imposed on the present invention. The present invention can also be applied to a different network configuration capable of forming a LAG.

Each disclosure of the above-listed Patent Literature and Non Patent Literatures is incorporated herein by reference. Modification and adjustment of each exemplary embodiment and each example are possible within the scope of the overall disclosure (including the claims) of the present invention and based on the basic technical concept of the present invention. Various combinations and selections of various disclosed elements (including each element in each claim, each element in each exemplary embodiment and each example, each element in each drawing, and the like) are possible within the scope of the claims of the present invention. That is, the present invention naturally includes various variations and modifications that could be made by those skilled in the art according to the overall disclosure including the claims and the technical concept.

P1-P4 port (number)
101 topology management unit
102, 117 link aggregation group management unit (LAG management unit)
103 relay apparatus control unit
111 relay apparatus communication unit
112 topology generation unit
113 topology table
114 broadcast path computation unit (BC path computation unit)
115 broadcast path control unit (BC path control unit)
116 address acquisition unit
118 link aggregation group port management table (LAG port management table)
119 link aggregation group terminal management table (LAG terminal management table)
1101, 1105, 1106 terminal apparatus
1102, 1103, 1104 relay apparatus
1100, 1100A control apparatus

The invention claimed is:
1. A control apparatus, comprising:
a memory storing a network topology and a port group information of a plurality of switch apparatus; and
a controller comprising a processor configured to execute program instructions to:
determine, based on the port group information, a representative port from a plurality of ports belonging to a port group;
calculate, based on the network topology and the port group information, a flow path such that a predetermined packet passes only the representative port among the port group;
determine, based on the flow path, a forwarding instruction to forward a packet along the flow path; and
send the forwarding instruction to the switch apparatus.

2. The control apparatus according to claim 1, wherein the predetermined packet is a multicast/broadcast packet.

3. The control apparatus according to claim 2, wherein the predetermined packet includes a source address of the switch apparatus.

4. The control apparatus according to claim 1, wherein the processor is configured to execute further program instructions to store the port group information registered by user to the storage.

5. The control apparatus according to claim 1, wherein the processor is configured to execute further program instructions to change the representative port when a failure of the representative port is detected.

6. A communication system, comprising:
a control apparatus; and
a plurality of switches to forward packets based on forwarding instructions from a control apparatus,
wherein the control apparatus comprises:
a memory storing a network topology and a port group information of a plurality of switch apparatus; and
a controller comprising a processor configured to execute program instructions to:
determine, based on the port group information, a representative port from a plurality of ports belonging to the port group;
calculate, based on the network topology and the port group information, a flow path such that a predetermined packet passes only the representative port among the port group;
determine, based on the flow path, a forwarding instruction to forward a packet along the flow path; and
send the forwarding instruction to the switch apparatus.

7. The communication system according to claim 6, wherein the predetermined packet is a multicast/broadcast packet.

8. The communication system according to claim 7, wherein the predetermined packet includes a source address of the switch apparatus.

9. The communication system according to claim 6, wherein the processor is configured to execute further program instructions to store the port group information registered by user to the storage.

10. The communication system according to claim 6, wherein the processor is configured to execute further program instructions to change the representative port when a failure of the representative port is detected.

11. A control method, comprising:
determining, based on a port group information of a plurality of switch apparatus, a representative port from a plurality of ports belonging to a port group;
calculating, based on a network topology and the port group information, a flow path such that a predetermined packet passes only the representative port among the port group;

determining, based on the flow path, a forwarding instruction to forward a packet along the flow path; and sending the forwarding instruction to a switch apparatus of the plurality of switch apparatuses.

12. The control method according to claim 11, wherein the predetermined packet is a multicast/broadcast packet.

13. The control method according to claim 12, wherein the predetermined packet includes a source address of the switch apparatus.

14. The control method according to claim 11, further comprising:

storing the port group information registered by user to the storage.

15. The control method according to claim 11, further comprising:

changing the representative port when a failure of the representative port is detected.

* * * * *